United States Patent
McConnell et al.

(10) Patent No.: US 7,444,375 B2
(45) Date of Patent: Oct. 28, 2008

(54) INTERACTIVE VOICE AND TEXT MESSAGE SYSTEM

(75) Inventors: Brian McConnell, San Francisco, CA (US); David Krupinski, Teaneck, NJ (US)

(73) Assignee: Visto Corporation, Redwood City, CA (US)

( * ) Notice: Subject to any disclaimer, the term of this patent is extended or adjusted under 35 U.S.C. 154(b) by 603 days.

(21) Appl. No.: 09/884,531

(22) Filed: Jun. 19, 2001

(65) Prior Publication Data

US 2002/0194281 A1    Dec. 19, 2002

(51) Int. Cl.
*G06F 15/16* (2006.01)

(52) U.S. Cl. ............... 709/206; 379/88.13; 379/88.01; 379/88.14; 379/88.12

(58) Field of Classification Search ................ 370/312, 370/313, 349, 389, 390, 392, 471; 709/206, 709/207, 217; 379/32.05, 93.24, 100.08, 379/265.09

See application file for complete search history.

(56) References Cited

U.S. PATENT DOCUMENTS

| | | | | | |
|---|---|---|---|---|---|
| 5,003,577 | A | * | 3/1991 | Ertz et al. | 379/88.13 |
| 5,199,062 | A | * | 3/1993 | Von Meister et al. | 379/88.04 |
| 5,390,236 | A | * | 2/1995 | Klausner et al. | 379/88.11 |
| 5,475,738 | A | * | 12/1995 | Penzias | 379/88.14 |
| 5,647,002 | A | * | 7/1997 | Brunson | 709/206 |
| 5,751,793 | A | * | 5/1998 | Davies et al. | 379/88.11 |
| 5,764,731 | A | * | 6/1998 | Yablon | 379/88.15 |
| 5,991,365 | A | * | 11/1999 | Pizano et al. | 379/88.13 |
| 5,995,597 | A | * | 11/1999 | Woltz et al. | 379/93.24 |
| 6,014,711 | A | * | 1/2000 | Brown | 709/245 |
| 6,028,921 | A | * | 2/2000 | Malik et al. | 379/201.04 |
| 6,212,550 | B1 | * | 4/2001 | Segur | 709/206 |
| 6,243,681 | B1 | * | 6/2001 | Guji et al. | 704/260 |
| 6,327,612 | B1 | * | 12/2001 | Watanabe | 709/206 |
| 6,343,329 | B1 | * | 1/2002 | Landgraf et al. | 709/246 |
| 6,351,523 | B1 | * | 2/2002 | Detlef | 379/88.14 |
| 6,404,762 | B1 | * | 6/2002 | Luzeski et al. | 370/352 |

(Continued)

FOREIGN PATENT DOCUMENTS

JP    02001154935 A    *    6/2001

(Continued)

OTHER PUBLICATIONS

Privacy Protection Principles for Voice Mail Systems, Tom Wright Commissioner, Oct. 1995.*

(Continued)

*Primary Examiner*—Jason Cardone
*Assistant Examiner*—Ajay Bhatia
(74) *Attorney, Agent, or Firm*—Oblon, Spivak, McClelland, Maier & Neustadt, P.C.

(57) ABSTRACT

The present invention provides a method for a user of a portable electronic device to respond to a received electronic message. Instructions for reply and message identification are appended to the electronic message to enable a response. The recipient replies by placing a telephone call to a server phone number. After authentication, a voice message is recorded, and, once approved by the sender, the message is converted to an archivable form. The recorded message is sent as an attachment to a text email message to the sender of the original electronic message.

11 Claims, 3 Drawing Sheets

U.S. PATENT DOCUMENTS

| | | | |
|---|---|---|---|
| 6,442,242 B1* | 8/2002 | McAllister et al. | 379/265.01 |
| 6,463,134 B1* | 10/2002 | Okada et al. | 379/93.24 |
| 6,501,832 B1* | 12/2002 | Saylor et al. | 379/88.04 |
| 6,636,733 B1* | 10/2003 | Helferich | 455/412.2 |
| 6,748,056 B1* | 6/2004 | Capriotti et al. | 379/88.17 |
| 6,751,453 B2* | 6/2004 | Schemers et al. | 455/412.1 |
| 6,757,362 B1* | 6/2004 | Cooper et al. | 379/88.01 |
| 6,775,359 B1* | 8/2004 | Ron et al. | 379/88.14 |
| 6,813,489 B1* | 11/2004 | Wu et al. | 455/412.1 |
| 7,065,189 B2* | 6/2006 | Wakabayashi | 379/88.26 |
| 7,245,612 B2* | 7/2007 | Petty et al. | 370/356 |
| 2001/0039187 A1* | 11/2001 | Shively | 340/7.2 |
| 2001/0051896 A1* | 12/2001 | Noh et al. | 709/206 |
| 2002/0002627 A1* | 1/2002 | Stead et al. | 709/238 |
| 2002/0131566 A1* | 9/2002 | Stark et al. | 379/88.19 |
| 2003/0043973 A1* | 3/2003 | Wakabayashi | 379/88.13 |
| 2004/0076272 A1* | 4/2004 | Zafar et al. | 379/88.13 |
| 2005/0198125 A1* | 9/2005 | Macleod et al. | 709/204 |
| 2006/0256934 A1* | 11/2006 | Mazor | 379/88.01 |

FOREIGN PATENT DOCUMENTS

JP          2002041417 A    *    2/2002

OTHER PUBLICATIONS

Answering System 1337.*
Aria Quick Reference Guide, , Jul. 1998.*
Voice Mail Manuals, Date Unknown.*
"CDA or WAV to MP3 Converter", Goolg Groups, Apr. 18-19, 1999.*
Schmandt, C. 1993. Phoneshell: the telephone as computer terminal. In Proceedings of the First ACM international Conference on Multimedia (Anaheim, California, United States, Aug. 2-6, 1993). Multimedia '93. ACM, New York, NY, 373-382.*
Pizano, A. and Hou, T. 1996. Integrated multimedia messaging concepts and applications. In Proceedings of the 1996 ACM Symposium on Applied Computing (Philadelphia, Pennsylvania, United States, Feb. 17-19, 1996). K. M. George, J. H. Carroll, D. Oppenheim, and J. Hightower, Eds. SAC '96. ACM, New York, NY, 12-16.*

* cited by examiner

INTERACTIVE VOICE AND TEXT MESSAGE SYSTEM

FIELD OF THE INVENTION

The present invention relates to the field of electronic communication, and more particularly to an electronic communication system between an office-based device and a portable device that enables a user of either device to receive text or voice messaging.

BACKGROUND OF THE INVENTION

Electronic communications are becoming more popular than ever, due in part to the increased variety and capability of portable electronic devices, e.g. cellular telephones, palm devices (PDA's), pagers, and laptop computers. A laptop computer can access the Internet, providing it has a modem or other telephone line-access device built in or connected to it. A recent advance in portable electronic devices allows access to the Internet through a modified cellular telephone. With such a telephone, textual electronic messages can be received and displayed on the telephone's screen, although only a few lines at a time. Prior to the present invention, a recipient of a message received through an Internet-capable telephone could reply by either of two somewhat deficient methods.

A first method of response was simply to place a conventional telephone call to the originator of the email message. This method has the problem of requiring the recipient of the email message to have, or be given, the telephone number of its originator, which is not always possible. The originator would then have to be able to access the telephone to which the recipient is sending the reply. The originator would also have to remember the original email message at the time of receiving a voice reply to properly appreciate or utilize the telephone response. Finally, the originator may have to go back to the originating device in order to reply again to the original recipient.

The second method by which the telephone recipient could reply to an email message received on the Internet-capable telephone is to type a text message on the telephone device The telephone device may have an ultra-miniature keypad which is awkward to use, a handwriting recognition interface which is prone to errors, or an alpha numeric (standard telephone) keypad. The problem with typing on the telephone device is that the keypad has only ten keys, far less than is needed for normal alpha use. The available solution to this typing problem is a system by which each of the keys can activate one of three letters by striking the key multiple times. In other words, the "2" key can be used for the letters A, B, and C by striking it once, twice, or three times, respectively. Not only does this system mean that typing requires up to three times more work than typing with a normal alphabetic keyboard, but the size and close proximity of the keys are such that typing is difficult and error-prone.

Therefore, it is an object of the present invention to provide a system by which a user of a portable electronic device can communicate by audio message to a text message email device.

It is a further object of the present invention to provide such a system wherein a text message includes a reply notice having a message-identifying number.

These and other objects of the present invention will become more apparent from the description to follow.

SUMMARY OF THE INVENTION

The present invention provides a method for enabling a user of a portable electronic device to communicate with a user of an office-based device by voice communication. The program for receiving and relaying the email message determines initially whether the recipient is registered as a user of the system. Registration provides the email gateway address and identification information for the user. Secondly, the gateway program assigns to the email message a message-identifying number and assembles the number and a reply notice to the message. The program then determines whether the message sender is listed in the database, and if not, enters the email address of the sender. The text message, with the reply notice and identifying number is then relayed to the recipient.

The recipient is presented with the message, the reply notice and the message-identifying number. The recipient is able to contact the gateway database by telephone and is authenticated as a registered user. The recipient is requested for the message-identifying number and prompted to record a voice reply message. The voice message is recorded into the database in MP3 format from which it can be accessed by the original sender of the email and played through the terminal's speaker.

DETAILED DESCRIPTION OF THE INVENTION

Figure 1:
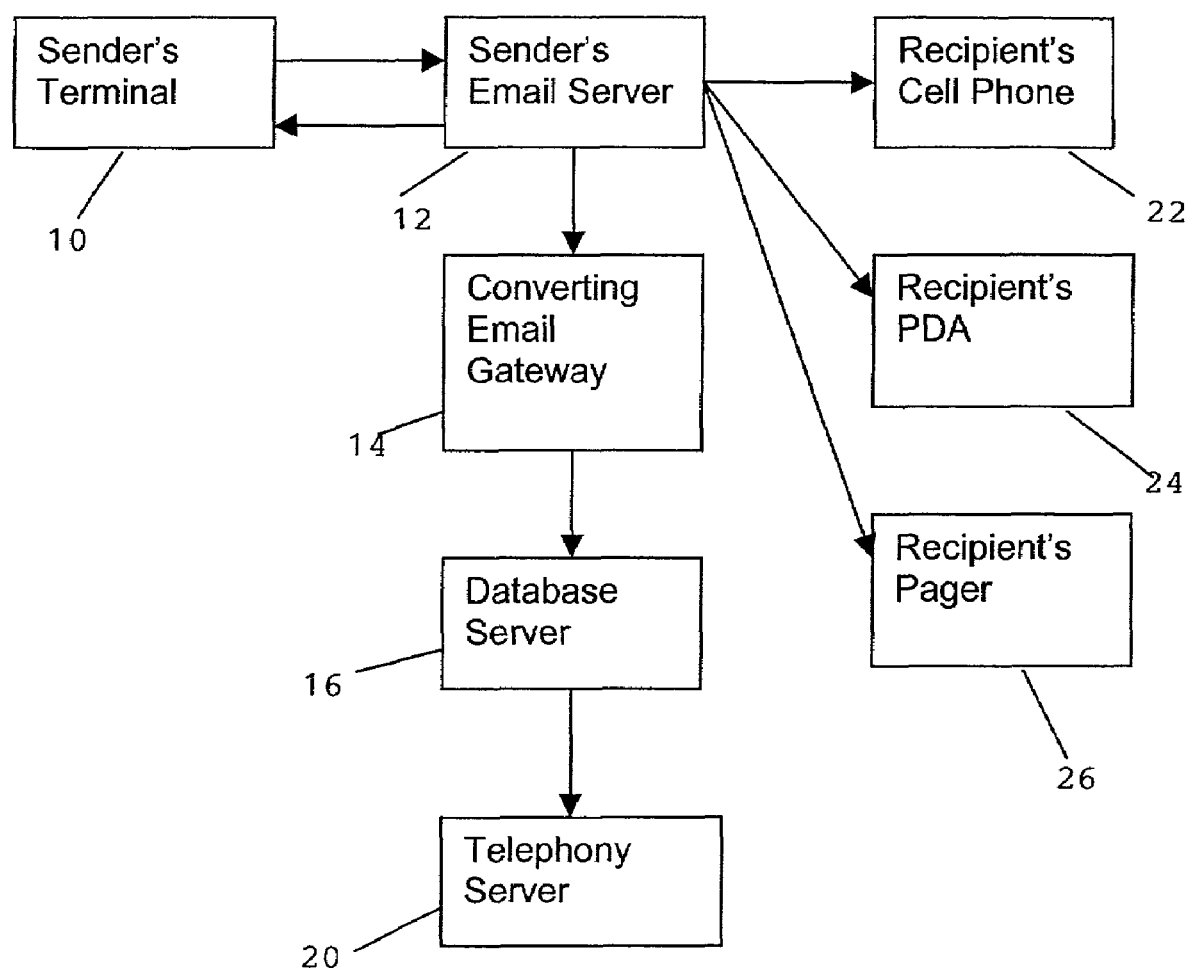
FIG. 1 is a schematic diagram illustrating the system of the present invention.

In accordance with the objects outlined above, the present invention provides an apparatus and method for enabling the recipient of an email message on a portable electronic device, or client, to respond to such email by voice communication. Referring now to FIG. 1, the apparatus of the invention is shown in diagrammatic form. The sender, or originator, of an electronic communication, specifically a text electronic mail message (hereafter referred to as email), typically generates and sends such an email from an office-based terminal 10, such as a personal computer (PC) or a laptop computer. The message is transmitted to an email server 12. Email server 12 relays the email to converting email gateway 14 which interacts with database server 16 and telephony server 20 as described below in regard to the method steps employed. Pursuant to the steps to be described hereinafter, the email is relayed to any one or all of the portable devices of the intended recipient, i.e., cell phone 22, palmtop computer (PDA) 24, and pager 26. The determination of which portable device, cell phone 22, PDA 24, or pager 26 is made on the basis of the recipient's file data in the system. Contact can be made to any or all of the portable devices, depending on the registration parameters of the recipient.

Figure 2:
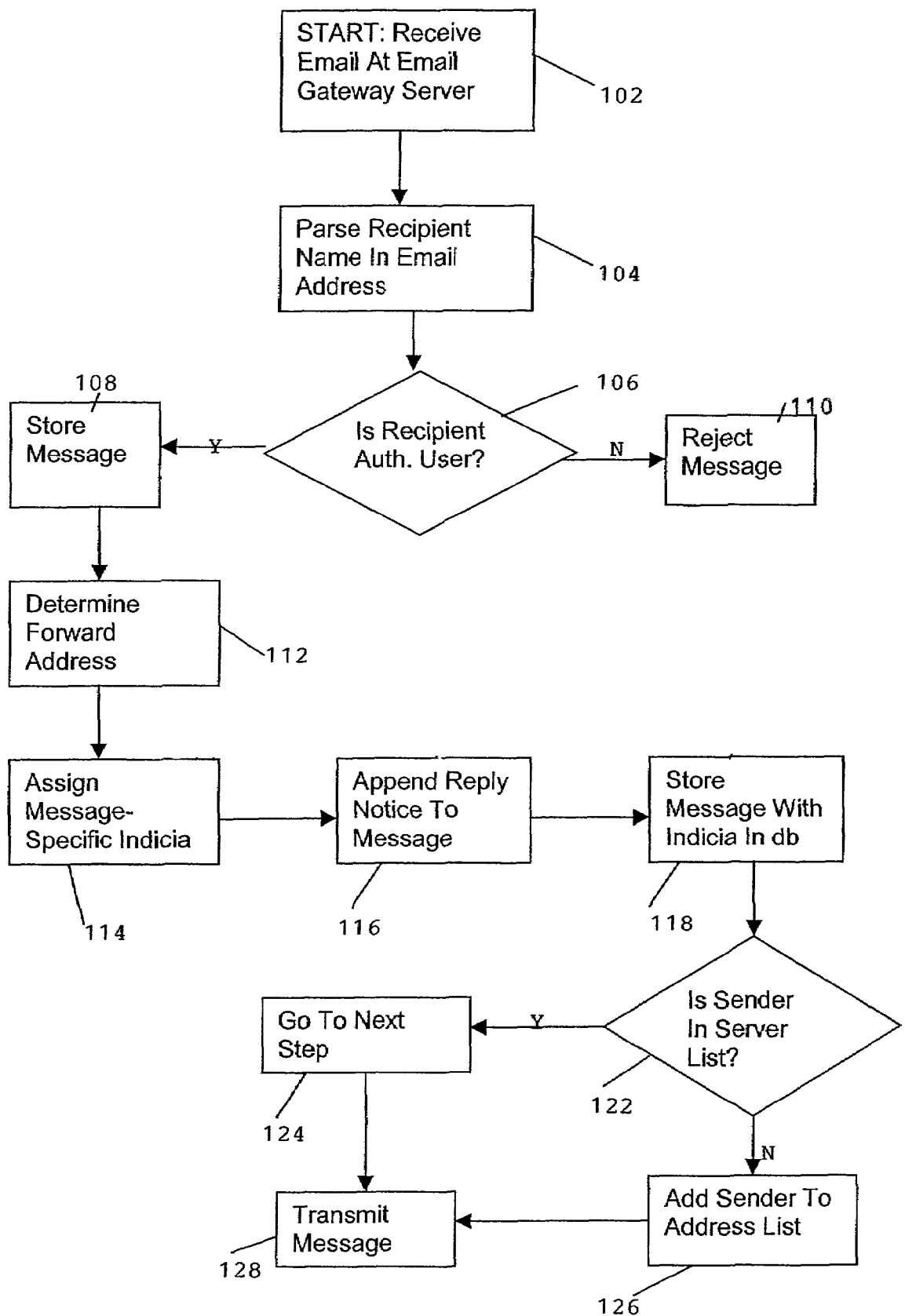
FIG. 2 is a flowchart showing the operating method steps of the present invention for forwarding an email to a portable electronic device.

Referring now to the flowchart of FIG. 2, the email that is sent from sender's terminal 10 (see FIG. 1) to sender's email server 12, and transferred to converting email gateway 14, is seen as being received at email gateway server in flowchart box 102. The receipt of an email in email gateway 14 activates a message-handling program to follow. The program analyzes the email address and parses the name of the intended recipient at step 104. A determination is then made as to whether the intended recipient is a authorized user of the system at decision point 106. If the response to query step 106 is negative, the message is rejected at step 110 and returned to the sender. If the response is affirmative, the message is stored at step 108 and the appropriate forwarding address is determined at step 112. Next, the program assigns to the email message a message-specific indicia, for example a serial number, at step 114 so that when the recipient receives and responds to the message, the reply can be communicated efficiently to the originating sender. The invention recognizes that an alphabetic message identicia is less desirable for the user of a cell phone-type keypad than a numerical identifier, although they serve the same purpose. The reply notice and the message-specific indicia are appended to the email at step 116. The reply notice contains text instructions to the recipient of the email that provides a telephone number for responding and the message-identifying number. A typical reply notice would state: "To reply by phone, call 1-800-123-4567, enter the message-identifying number 890 when prompted, and record a voice response after you hear the tone."

The message-specific indicia and the email are stored in database server 16 (see FIG. 1) at step 118. The server address list is checked at step 122 to determine whether the sender's address is listed. If the answer to the query at step 122 is affirmative, the program moves ahead at step 124 and transmits the message to the recipient at step 128. If the answer is negative, the address is added to the list at step 126 and the message is then sent to the recipient at step 128.

Although the recipient will ordinarily receive the email at a selected portable electronic device 22, 24, 26, the portable client user may respond from any telephone or electronic device. As will be apparent to those skilled in the art, the present invention can be equally be useful when the user of a portable electronic device is the initiator of, rather than the recipient of, an electronic message.

Figure 3:
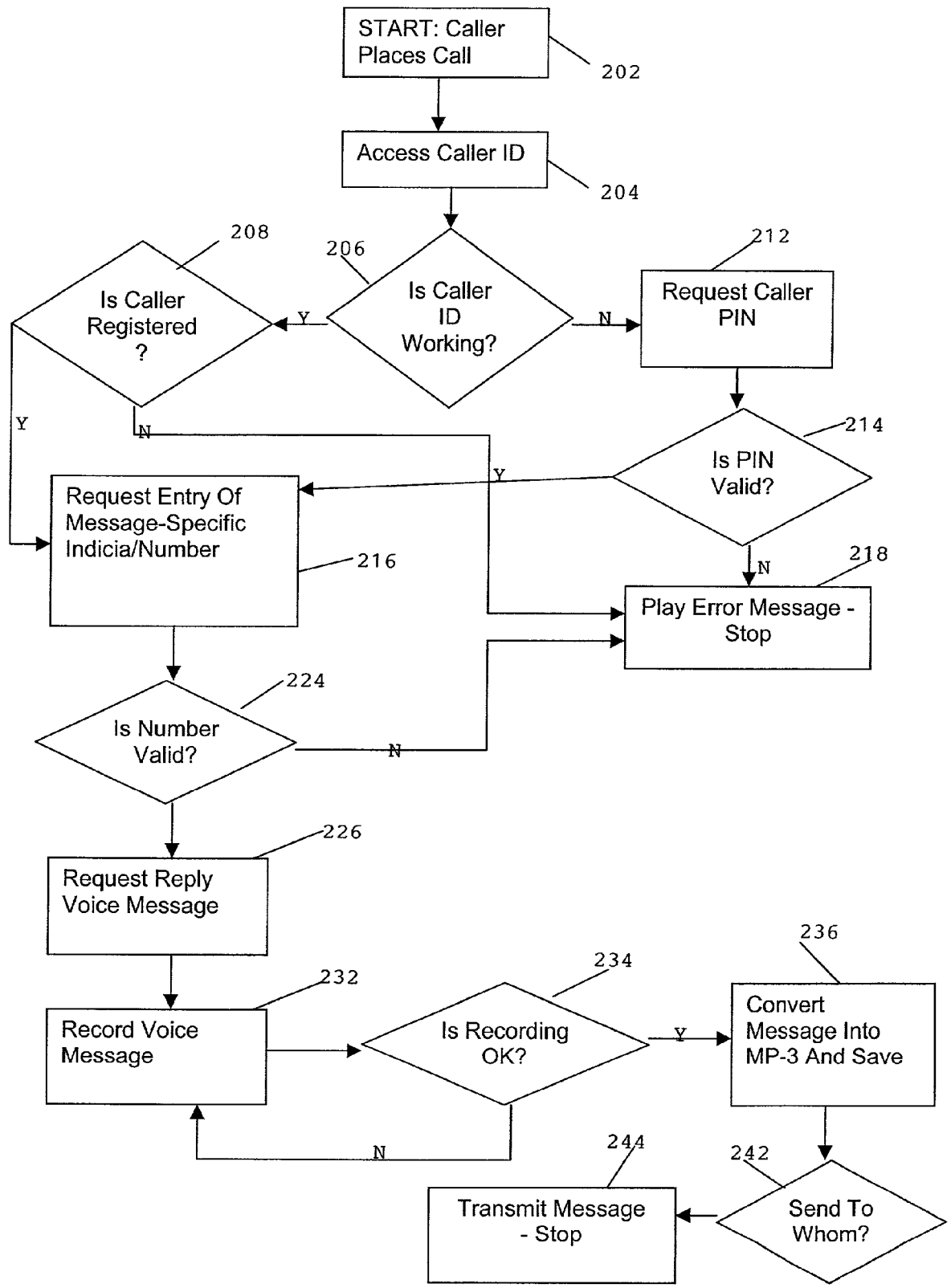
FIG. 3 is a flowchart showing the operating method steps of the present invention for enabling a voice response to a text email.

Referring now to FIG. 3, the portable device user places a telephone call to the sender's email server at flowchart box 202. The email server transfers the call to converting email gateway 14 (FIG. 1) which activates "caller ID" service at step 204 to attempt to identify the caller. A determination of whether the caller ID feature is operating, either because of a possible recipient block or otherwise, is made at query step 206. If caller ID is operating, the system checks its database at query step 208 to determine whether the caller is a registered user of the system. If the caller is a registered user of the system, the caller is prompted to enter the pre-assigned message-identifying number at step 216. If the caller is not a registered user of the system, an error message is played at step 228 and the program is stopped.

If the system has determined at step 206 that caller ID was not working, the caller is prompted to enter a personal identification number (PIN) at step 212, which is authenticated at step 214. If the PIN is valid, the caller is prompted to enter the pre-assigned message-identifying number at step 216. If the PIN is not valid, an error message is played at step 228 and the program is stopped.

The system determines at decision point 224 if the message-identifying serial number is valid. If valid, the caller is prompted at step 226 to record a responsive voice message, which is recorded at step 232. If the message-identifying serial number given is not valid, an error message is played at step 228 and the program is stopped. If the message-identifying serial number is valid, the caller is asked whether the recorded message is acceptable at step 234. If the response is affirmative, the received message is converted into MP-3 format, as is known, and is saved in the system server at step 236. In MP-3 format, the voice message can be sent to an email recipient as an attachment to an email for replay on the receiving office-based terminal. If the message is not acceptable as determined in step 240, the message may be recorded a second time and the program recycles to step 234 to verify the acceptability.

The caller is then asked to whom to send the message at step 242, which may be one or more addressees. If the voice message is a reply to a prior message, either of the standard choices of "Reply" or "Reply To All" may be selected. The recorded and MP-3 converted message is then transmitted to the addressee(s) at step 244, and the program is stopped at step 248.

While the present invention is described with respect to specific embodiments thereof, it is recognized that various modifications and variations thereof may be made without departing from the scope and spirit of the invention, which is more clearly understood by reference to the claims appended hereto. The invention particularly recognizes that electronic communication initiated by a user of a portable device and responded to by a user of an office-based terminal is also within the scope of the present invention.

What is claimed is:

1. A method for enabling a portable electronic device to communicate with an enterprise terminal of an enterprise, comprising:

receiving a call in an email server of the enterprise from the portable electronic device;

determining if the portable electronic device is registered in the email server of the enterprise;

obtaining, at the email server, a pre-assigned message identifier from the portable electronic device, the pre-assigned message identifier assigned by the e-mail server to an e-mail message provided to the portable electronic device from the email server, the pre-assigned message identifier corresponding to an author of the received email;

authenticating the pre-assigned message identifier at the email server of the enterprise;

requesting a recording of a voice message from the user of the portable electronic device as a reply to the email message;

recording the voice message at the email server; and transmitting the voice message to the enterprise terminal.

2. The method for enabling a portable electronic device to communicate with an enterprise terminal according to claim 1, further comprising:

converting the recorded voice message into a format adapted for attachment to an electronic message.

3. The method for enabling a portable electronic device to communicate with an enterprise terminal according to claim 1, further comprising:

playing an error message and terminating communication with the e-mail server if the device is not registered in the email server.

4. The method for enabling a portable electronic device to communicate with an enterprise terminal by voice according to claim 1, further comprising:

determining if the recorded message is acceptable; and recording the message again if the previously recorded message is not acceptable.

5. The method for enabling a portable electronic device to communicate with a terminal according to claim 1, further comprising:

identifying a user of the portable electronic device by using a Caller ID service.

6. The method for enabling a portable electronic device to communicate with a an enterprise terminal according to claim 1, further comprising:

prompting, if a Caller ID service is not operating, a user of the portable electronic device to enter a personal identification number ("PIN"); and authenticating the PIN to determine whether the PIN is valid.

7. The method for enabling a portable electronic device to communicate with an enterprise terminal according to claim 1, wherein the pre-assigned message identifier allows transmission of the voice message to the enterprise terminal.

8. A method for enabling a portable electronic device to communicate with an enterprise terminal of an enterprise, comprising:

receiving a call in an email server of the enterprise from the portable electronic device;

determining if the portable electronic device is registered in the email server;

obtaining, at the email server, a pre-assigned message identifier from the portable electronic device, the pre-assigned message identifier assigned by the email server to an email message provided to the portable electronic device from the email server, the pre-assigned message identifier corresponding to an author of the received email;

authenticating the pre-assigned message identifier at the email server of the enterprise;

requesting a recording of a voice message from the user of the portable electronic device as a reply to the email message;

recording the voice message at the email server;

converting the recorded voice message into MP3 format; and transmitting the converted voice message to the user of the enterprise terminal.

9. The method for enabling a portable electronic device to communicate with an enterprise terminal according to claim 8, further comprising identifying a user of the device by using a Caller ID service.

10. The method for enabling a portable electronic device to communicate with an enterprise terminal according to claim 8, further comprising:

prompting, if a Caller ID service is not operating, a user of the portable electronic device to enter a PIN; and authenticating the PIN to determine whether the PIN is valid.

11. The method for enabling a portable electronic device to communicate with an enterprise terminal according to claim 8, wherein the pre-assigned message identifier allows transmission of the voice message to the terminal.

* * * * *